(12) United States Patent  (10) Patent No.: US 8,964,303 B2
Miyazawa  (45) Date of Patent: Feb. 24, 2015

(54) ZOOM LENS AND IMAGE PICKUP APPARATUS HAVING THE SAME

(71) Applicant: Canon Kabushiki Kaisha, Tokyo (JP)

(72) Inventor: Nobuyuki Miyazawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 13/681,836

(22) Filed: Nov. 20, 2012

(65) Prior Publication Data

US 2013/0148211 A1  Jun. 13, 2013

(30) Foreign Application Priority Data

Dec. 8, 2011  (JP) ................................. 2011-268811

(51) Int. Cl.
*G02B 15/14* (2006.01)
*G02B 15/173* (2006.01)

(52) U.S. Cl.
CPC .............. *G02B 15/14* (2013.01); *G02B 15/173* (2013.01)
USPC ........................................................ 359/687

(58) Field of Classification Search
CPC .............................. G02B 15/14; G02B 15/173
USPC ................................................ 359/686–687
See application file for complete search history.

(56) References Cited

U.S. PATENT DOCUMENTS

| 5,585,966 A * | 12/1996 | Suzuki ........................... 359/557 |
| 5,712,733 A | 1/1998 | Mukaiya |
| 2008/0165428 A1* | 7/2008 | Arimoto et al. ................ 359/687 |

FOREIGN PATENT DOCUMENTS

JP  08-201695 A  8/1996
JP  2001-116996 A  4/2001

* cited by examiner

*Primary Examiner* — Scott J Sugarman
*Assistant Examiner* — Vipin Patel
(74) *Attorney, Agent, or Firm* — Fitzpatrick, Cella, Harper & Scinto (57) ABSTRACT

A zoom lens, in order from an object side to an image side, includes a first lens unit having a positive refractive power, a second lens unit having a negative refractive power, a third lens unit having a positive refractive power, and a fourth lens unit having a positive refractive power, the first lens unit is fixed and at least the second and fourth lens unit are moved during zooming, the third lens unit is configured by a cemented lens formed by cementing a negative lens having a meniscus shape convex towards the object side and a positive lens, the fourth lens unit is configured by a cemented lens formed by cementing a negative lens having a meniscus shape convex towards the object side and a positive lens, and focal lengths f3 and f4 of the third lens unit and the fourth lens unit are appropriately set.

11 Claims, 9 Drawing Sheets

ZOOM LENS AND IMAGE PICKUP APPARATUS HAVING THE SAME

BACKGROUND OF THE INVENTION

1. Field of the Invention

The present invention relates to a zoom lens, and more particularly to an image pickup lens that is suitably used for an image pickup apparatus such as a video camera, a surveillance camera, a digital still camera, a broadcast camera, or a silver-salt film camera.

2. Description of the Related Art

A zoom lens having a small-size total system with a high zoom ratio is required for an image pickup optical system that is used for an image pickup apparatus such as a video camera, a surveillance camera, or a digital still camera. As a small-size zoom lens with a high zoom ratio, a four-unit zoom lens of a positive lead type that is configured by four lens units as a whole, which includes a lens unit having a positive refractive power (an inverse of a focal length) disposed closest to an object side, is known. As a four-unit zoom lens, a zoom lens which includes, in order from an object side to an image side, first to fourth lens units having positive, negative, positive, and positive refractive powers respectively is known.

A four-unit zoom lens of a rear focus type in which the second lens unit or both the second lens unit and the third lens unit in the lens units are moved to perform a magnification varying operation and also the fourth lens unit is moved to correct a variation of an image plane due to the magnification variation while focusing is known.

U.S. Pat. No. 5,712,733 and Japanese Patent Laid-Open No. 2001-116996 disclose a four-unit zoom lens having a high optical performance over an entire zoom range in spite of having a small number of lenses as a whole.

It is comparatively easy for the four-unit zoom lens of the positive lead type to achieve a small size of the total system and a high zoom ratio. However, in order to obtain a high optical performance over the entire zoom range while achieving the small size of the total system and the high zoom ratio, it is important to appropriately set a refractive power of each lens unit, a lens configuration, and the like. For example, in order to obtain a high optical performance in the entire zoom range while having a small number of lenses as a whole and also reducing deterioration of the optical performance caused by a manufacturing error, it is important to appropriately set the refractive powers and the lens configurations of the third lens unit and the fourth lens unit.

If these configurations are not appropriately set, it is difficult to obtain a high optical performance over the entire zoom range while achieving a small size of the total system and a high zoom ratio. For example, in the four-unit zoom lens which has a first lens fixed during zooming, there are optical characteristics that a diameter of a light beam entering the third lens unit is increased at a wide angle end. Therefore, the third lens unit has an optical role of correcting spherical aberration or coma aberration at the wide angle end.

In this case, if the refractive power of the third lens unit is weakened and also the diameter of the light beam entering the fourth lens unit is increased, it is easy to correct the spherical aberration or the coma aberration using whole of third lens unit and the fourth lens unit at the wide angle end. However, when for example the third lens unit and the fourth lens unit are decentered due to the manufacturing error and the like, a large amount of the coma aberration caused by the decentering is generated.

On the other hand, when the refractive power of the third lens unit is strengthened, it is possible to correct the spherical aberration or the coma aberration at the wide angle end only by using the third lens unit. In this case, in order to reduce the number of the lenses of the third lens unit while appropriately performing the aberration correction, there is a method of using the third lens unit in which a positive lens and a negative lens are disposed in order from the object side to the image side and a negative refractive power is given to a lens surface closest to the image side. In this method, since a positive refractive power is ensured by a lens surface other than the lens surface closest to the image side, a curvature of the lens surface closest to the object side tends to be increased or a refractive power of an air lens between the positive lens and the negative lens tends to be increased.

As a result, a large amount of high-order spherical aberration or coma aberration tends to be generated. In this case, when manufacturing errors of parts are contained, the optical performance is significantly deteriorated. In particular, a large difference between the spherical aberrations in a short wavelength and a long wavelength is generated, and it is difficult to correct these aberrations.

SUMMARY OF THE INVENTION

The present invention provides a zoom lens having a small-size total system with a high zoom ratio that has a high optical performance over an entire zoom range even when considering a manufacturing error and an image pickup apparatus having the zoom lens.

A zoom lens as one aspect of the present invention includes, in order from an object side to an image side, a first lens unit having a positive refractive power, a second lens unit having a negative refractive power, a third lens unit having a positive refractive power, and a fourth lens unit having a positive refractive power, the first lens unit is fixed and at least the second lens unit and the fourth lens unit are moved during zooming, the third lens unit is configured by a cemented lens that is formed by cementing a negative lens having a meniscus shape convex towards the object side and a positive lens, the fourth lens unit is configured by a cemented lens that is formed by cementing a negative lens having a meniscus shape convex towards the object side and a positive lens, and focal lengths f3 and f4 of the third lens unit and the fourth lens unit are appropriately set.

Further features and aspects of the present invention will become apparent from the following description of exemplary embodiments with reference to the attached drawings.

DESCRIPTION OF THE EMBODIMENTS

Exemplary embodiments of a zoom lens of the present invention and an image pickup apparatus having the zoom lens will be described below with reference to the accompanied drawings. The zoom lens of the present invention includes, in order from an object side to an image side, a first lens unit having a positive refractive power, a second lens unit having a negative refractive power, a third lens unit having a positive refractive power, and a fourth lens unit having a positive refractive power. In zooming, the first lens unit is fixed (is not moved), and at least the second and fourth lens units are moved on an optical axis. The zoom lens of the present invention may also be configured so that a lens unit having a refractive power is disposed on at least one of the object side of the first lens unit or the image side of the fourth lens unit.

Figure 1:
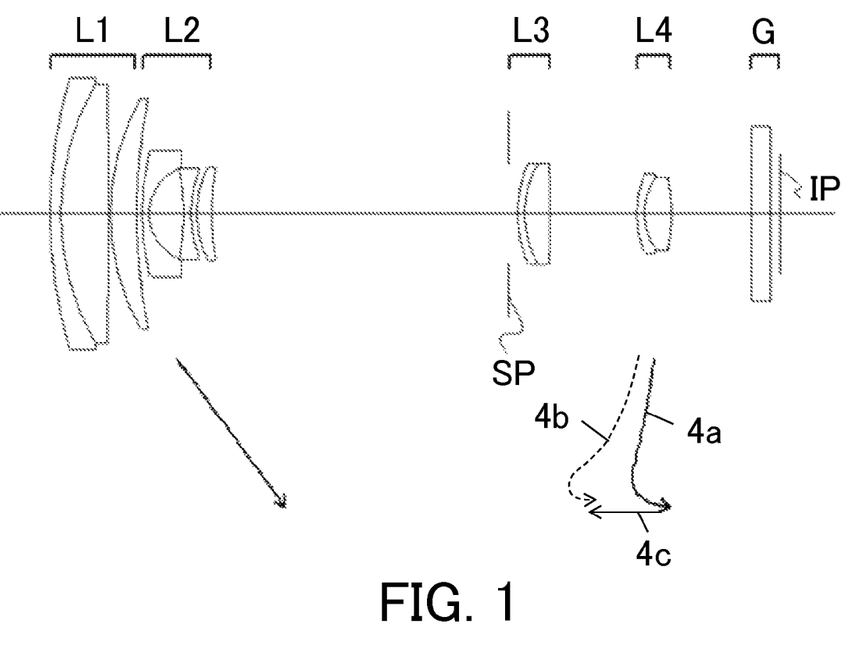
FIG. 1 is a cross-sectional diagram of a zoom lens at a wide angle end in Embodiment 1.
Figure 2A:
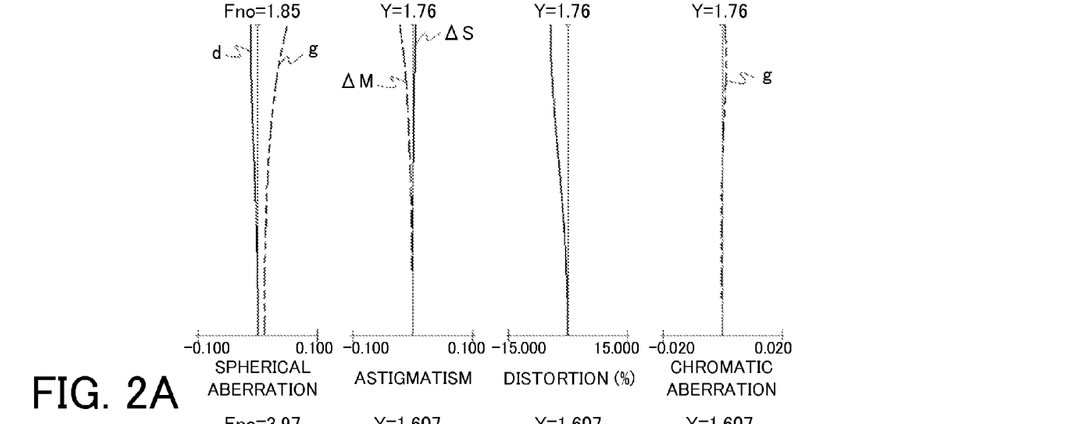
FIGS. 2A, 2B, and 2C are aberration diagrams of the zoom lens in Embodiment 1.
Figure 2B:
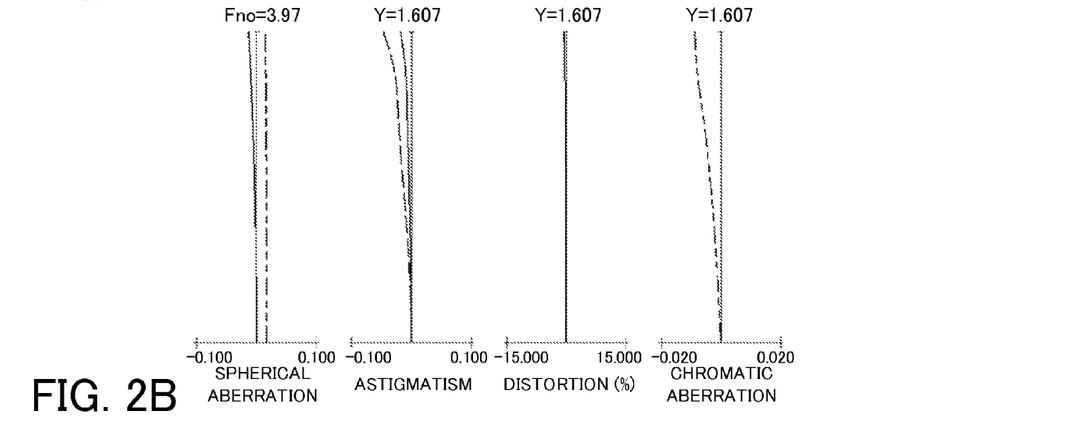
Figure 2C:
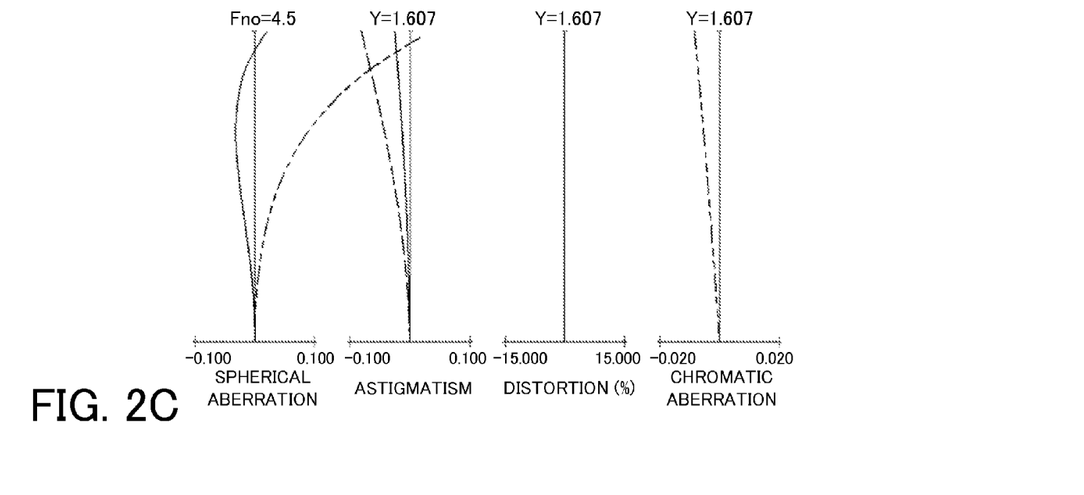
Figure 3:
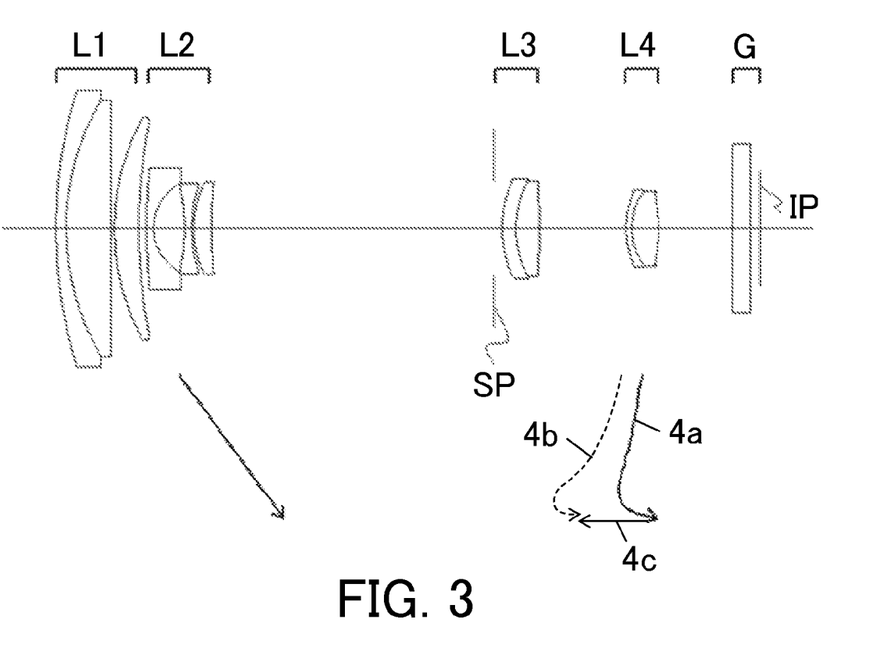
FIG. 3 is a cross-sectional diagram of a zoom lens at a wide angle end in Embodiment 2.
Figure 4A:
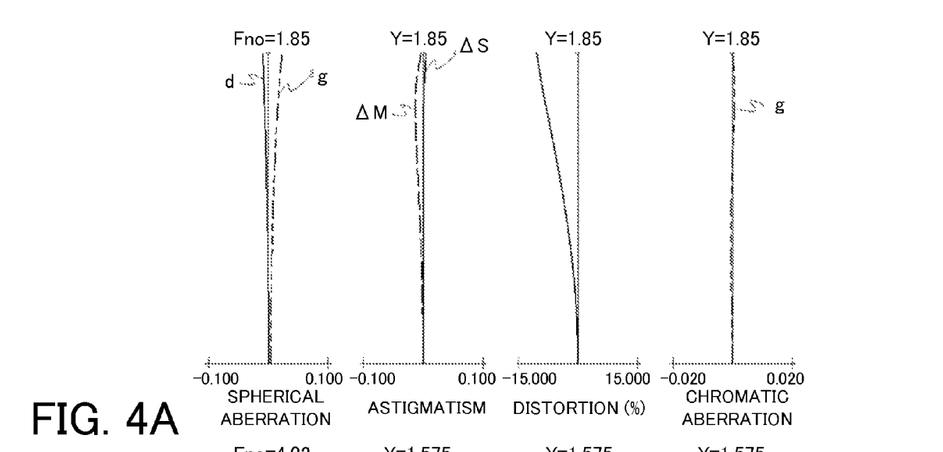
FIGS. 4A, 4B, and 4C are aberration diagrams of the zoom lens in Embodiment 2.
Figure 4B:
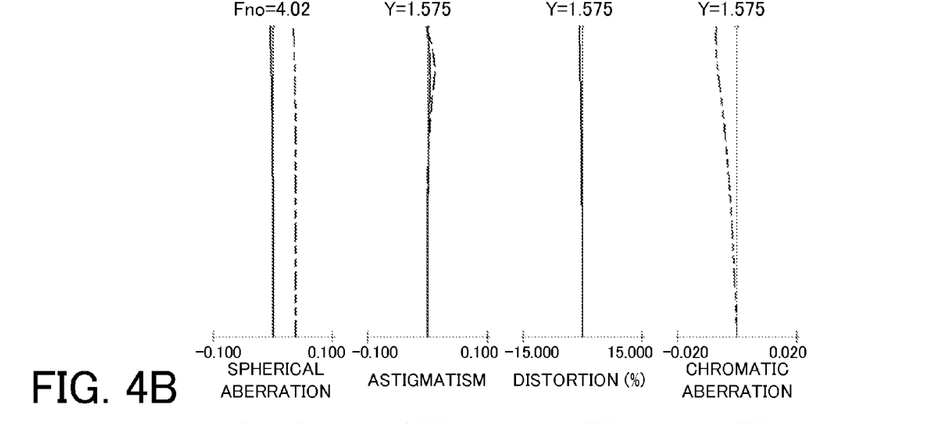
Figure 4C:
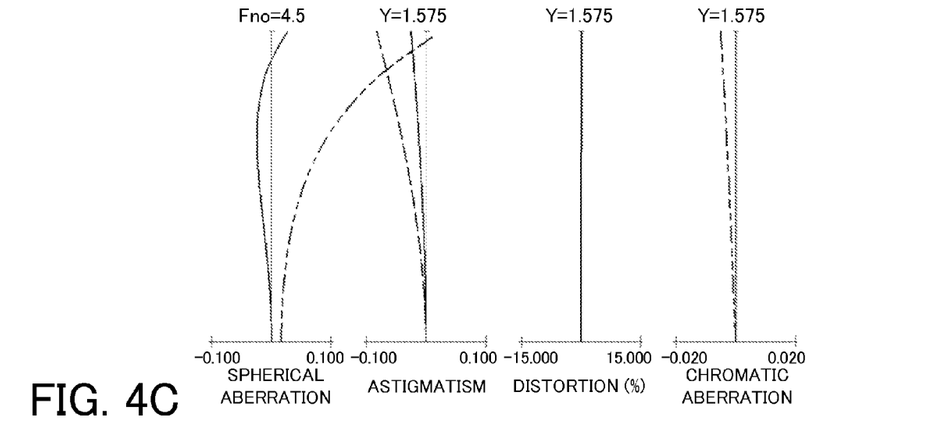

FIG. 1 is a cross-sectional diagram of lenses at a wide angle end (at a short focus end) of the zoom lens of Embodiment 1 of the present invention, and FIGS. 2A, 2B, and 2C are aberration diagrams of the zoom lens of Embodiment 1 at the wide angle end, at an intermediate zoom position, and a telephoto end (at a long focus end), respectively. FIG. 3 is a cross-sectional diagram of lenses at the wide angle end of the zoom lens of Embodiment 2 of the present invention, and FIGS. 4A, 4B, and 4C are aberration diagrams of the zoom lens of Embodiment 2 at the wide angle end, at the intermediate zoom position, and the telephoto end, respectively.

Figure 5:
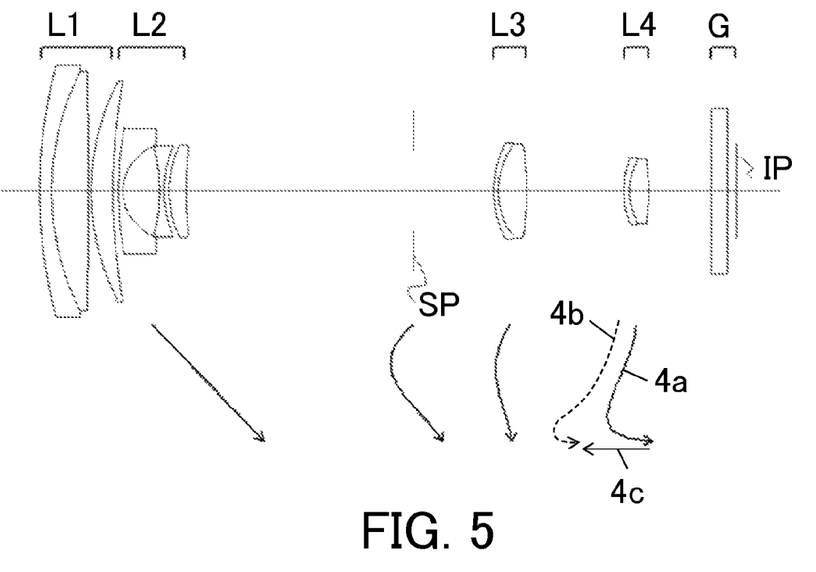
FIG. 5 is a cross-sectional diagram of a zoom lens at a wide angle end in Embodiment 3.
Figure 6A:
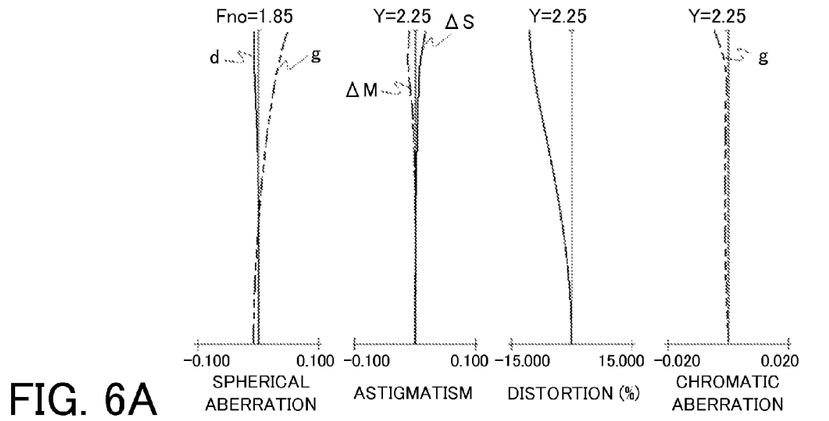
FIGS. 6A, 6B, and 6C are aberration diagrams of the zoom lens in Embodiment 3.
Figure 6B:
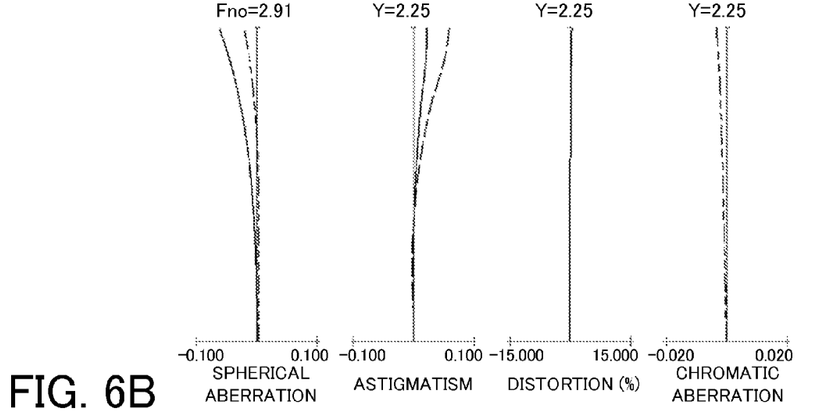
Figure 6C:
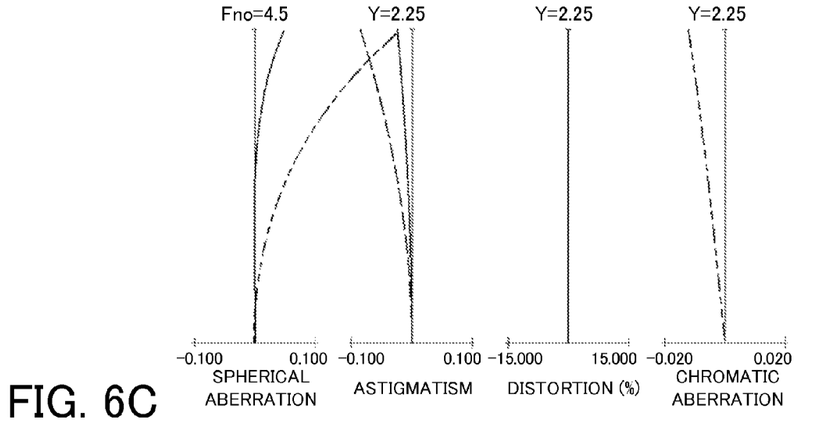
Figure 7:
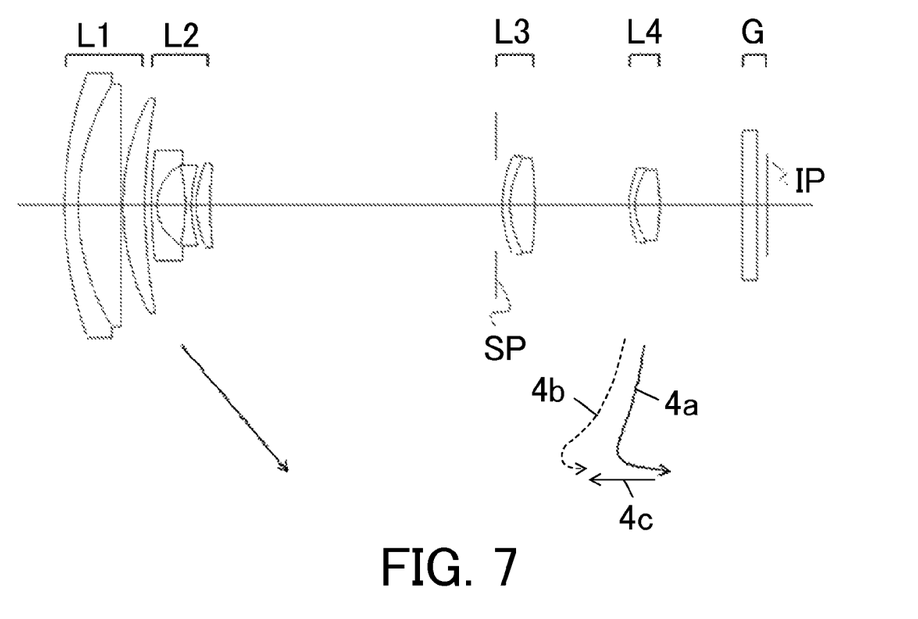
FIG. 7 is a cross-sectional diagram of a zoom lens at a wide angle end in Embodiment 4.
Figure 8A:
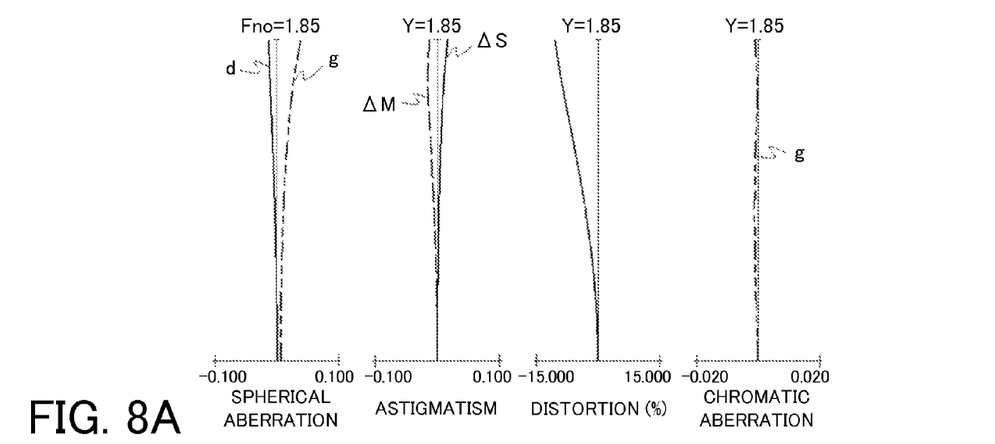
FIGS. 8A, 8B, and 8C are aberration diagrams of the zoom lens in Embodiment 4.
Figure 8B:
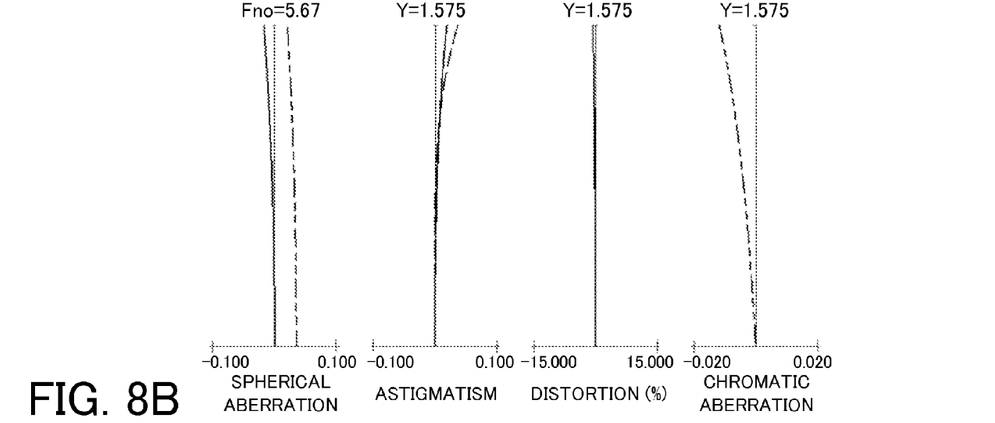
Figure 8C:
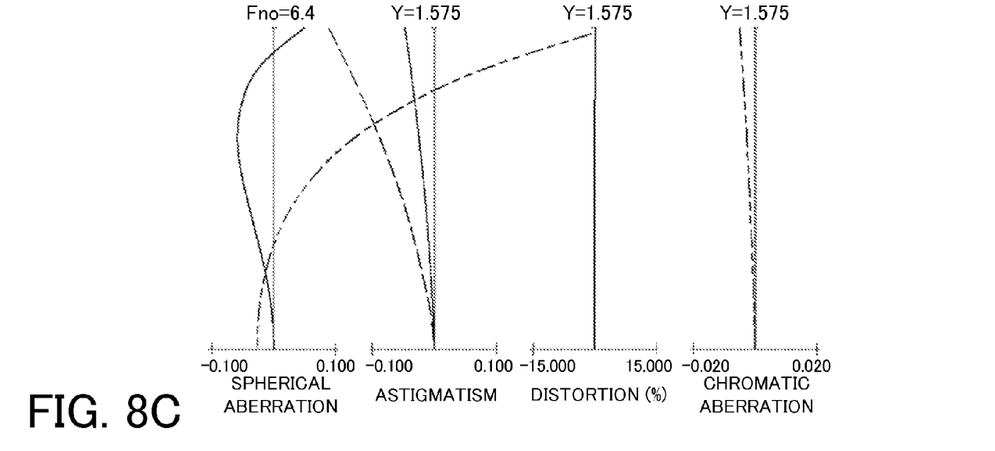
Figure 9:
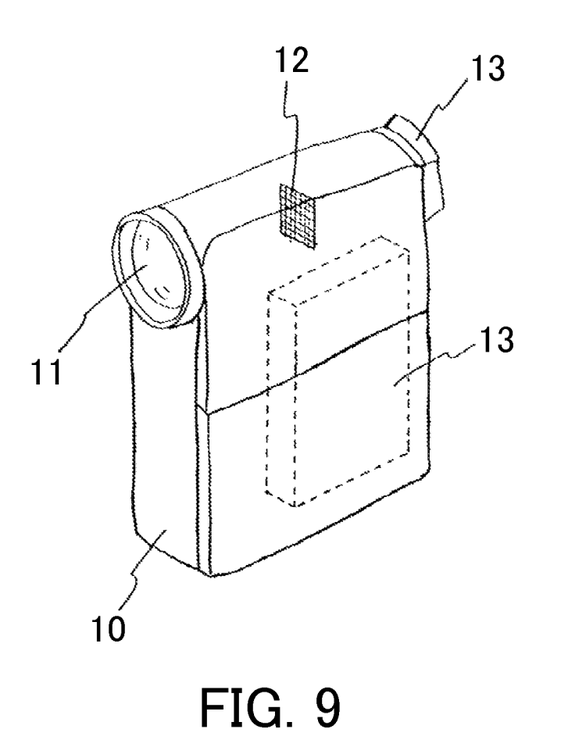
FIG. 9 is a schematic diagram of a main part of a video camera of the present invention.

FIG. 5 is a cross-sectional diagram of lenses at the wide angle end of the zoom lens of Embodiment 3 of the present invention, and FIGS. 6A, 6B, and 6C are aberration diagrams of the zoom lens of Embodiment 3 at the wide angle end, at the intermediate zoom position, and the telephoto end, respectively. FIG. 7 is a cross-sectional diagram of lenses at the wide angle end of the zoom lens of Embodiment 4 of the present invention, and FIGS. 8A, 8B, and 8C are aberration diagrams of the zoom lens of Embodiment 4 at the wide angle end, at the intermediate zoom position, and the telephoto end, respectively. FIG. 9 is a schematic diagram of a main part of a video camera (an image pickup apparatus) that is equipped with the zoom lens of the present invention.

The zoom lens of each of Embodiments 1 to 4 is an image pickup lens system that is used for the image pickup apparatus. In the cross-sectional diagram of the zoom lens, the left side indicates the object side and the right side indicates the image side. In the cross-sectional diagram of the zoom lens, reference symbol L1 denotes the first lens unit having the positive refractive power, reference symbol L2 denotes the second lens unit having the negative refractive power, reference symbol L3 denotes the third lens unit having the positive refractive power, and reference symbol L4 denotes the fourth lens unit having the positive refractive power. Reference symbol SP denotes an aperture stop, which is located at the object side of the third lens unit L3 and is fixed (is not moved) or is moved during zooming.

Reference symbol G denotes an optical block that corresponds to an optical filter or a face plate. Reference code IP denotes an image plane, which corresponds to an imaging surface of a solid-state image pickup element such as a CCD sensor or a CMOS sensor when used as an image pickup optical system of the digital still camera or the video camera, or corresponds to a film surface when used as the silver-salt film camera. In the spherical aberration diagram, reference symbols d and g denote d-line and g-line, respectively. In the astigmatism diagram, reference symbols $\Delta M$ and $\Delta S$ denote a meridional image plane and a sagittal image plane for the d-line, respectively. In the distortion diagram, the d-line is indicated, and in the chromatic aberration of magnification indicates an aberration of the g-line for the d-line. Reference symbol Fno denotes an F-number, and reference symbol Y denotes an image height.

In the following each embodiment, the wide angle end and the telephoto end mean zoom positions when a magnification-varying lens unit (the second lens unit) is respectively located at a corresponding one of both ends in a mechanically movable range on the optical axis.

In Embodiments 1, 2, and 4, the second lens unit L2 is moved to the image side as indicated by an arrow during zooming from the wide angle end to the telephoto end. In addition, the fourth lens unit L4 is moved along a locus convex towards the object side so as to correct an image plane variation caused by the magnification variation. In Embodiment 3, when zooming is performed from the wide angle end to the telephoto end, the second lens unit L2 is moved to the image side, and the aperture stop SP, the third lens unit L3, and the fourth lens unit L4 are moved to the object side along a locus convex towards the object side.

In each embodiment, a rear focus method that moves the fourth lens unit L4 on the optical axis so as to perform a focusing is adopted. A curve line 4a depicted as a solid line and a curve line 4b depicted as a dashed line each relating to the fourth lens unit L4 are movement trajectories for correcting the image plane variation caused by the magnification variation when focusing on an infinite object and a short distance object, respectively. When the focusing is performed from the infinite object to the short distance object at the telephoto end, the fourth lens unit L4 is moved to the front as indicated by an arrow 4C.

At the time of shooting an image, the third lens unit L3 is appropriately moved in a direction having a component of a direction perpendicular to the optical axis so as to move the shot image in the direction perpendicular to the optical axis. As a result, a blur of the shot image which is generated by the shake of the zoom lens is corrected. In other words, an image stabilizing operation is performed. The zoom lens of each embodiment is, in order from the object side to the image side, configured by the first lens unit L1 having the positive refractive power, the second lens unit L2 having the negative refractive power, the third lens unit L3 having the positive refractive power, and the fourth lens unit L4 having the positive refractive power, which easily achieves a high zoom ratio as well as reduction in size of a total system.

In the zoom lens having such a zoom type, when the first lens unit L1 is decentered, the field curvature is not rotationally symmetric at the telephoto end, and for example object distances at which in-focus state is obtained are different between the right and the left of the image, which is not preferable. Therefore, the first lens unit L1 is fixed with respect to the image plane during zooming so as not to have a clearance (a moving space) for a lens barrel.

The third lens unit L3 is configured by a cemented lens that is formed by cementing a negative lens having a meniscus shape convex towards the object side and a positive lens. As a result, the decentering of two lenses in the third lens unit L3 are avoided, and also an incident angle of a bottom ray of an off-axis light beam onto a surface of the cemented lens is gentle especially at the wide angle end, and the correction of a high order spherical aberration or coma aberration is easily performed. Furthermore, the difference of the spherical aberrations or the coma aberrations in a short wavelength and a long wavelength is appropriately corrected.

The fourth lens unit L4 is configured by a cemented lens that is formed by cementing a negative lens having a meniscus shape convex towards the object side and a positive lens. As a result, the decentering of two lenses in the fourth lens unit L4 are avoided, and also an incident angle of an axial ray onto a surface of the cemented lens is gentle especially at the wide angle end, and the difference of the spherical aberrations in a short wavelength and a long wavelength is appropriately corrected. Both the third lens unit L3 and the fourth lens unit L4 are configured by a combination of the negative lens and the positive lens so as to achieve an achromatic configuration, and therefore the variation of an axial chromatic aberration is reduced during zooming.

Focal lengths of the third lens unit L3 and the fourth lens unit L4 are denoted by f3 and f4, respectively. In the embodiment, the following conditional expression is met.

$$0.68 < f3/f4 < 1.20 \quad (1)$$

Conditional Expression (1) is an expression of defining a ratio of the focal lengths of the third lens unit L3 and the fourth lens unit L4. When a value exceeds the upper limit of Conditional Expression (1), which means the refractive power of the third lens unit L3 is weakened, a diameter of the light beam entering the fourth lens unit L4 is enlarged at the wide angle end. In the zoom lens of each embodiment, the spherical aberration or the coma aberration at the wide angle end is corrected by whole of the third lens unit L3 and the fourth lens unit L4.

Therefore, when the third lens unit L3 and the fourth lens unit L4 are decentered by a manufacturing error or the like, it is difficult to correct the spherical aberration or the coma aberration at the wide angle end, and a large amount of the coma aberration caused by the decentering is generated. On the contrary, when the value exceeds the lower limit, the refractive power of the third lens unit L3 is strengthened, and therefore it is difficult to correct the spherical aberration or the coma aberration at the wide angle end. Furthermore, the refractive power of the fourth lens unit L4 is weakened, a moving amount of the fourth lens unit L4 is enlarged at the telephoto end when the correction of the image plane variation is performed during zooming by the fourth lens unit L4, and therefore it is difficult to appropriately correct the variation of the field curvature. It is more preferred that a numerical range of Conditional Expression (1) be set as follows.

$$0.71 < f3/f4 < 1.16 \quad (1a)$$

In each embodiment, it is further preferred that at least one of the following conditional expressions be met. Radii of curvature of lens surfaces at the object side and the image side of the negative lens of the third lens unit L3 are denoted by R3n1 and R3n2, respectively. A refractive index and Abbe number of a material of the negative lens of the third lens unit L3 are denoted by N3n and v3n respectively, and a refractive index of a material of the negative lens of the fourth lens unit L4 is denoted by N4n. A distance from a lens surface closest to the image side of the first lens unit L1 to a lens surface closest to the object side of the third lens unit L3 at the wide angle end is denoted by D13w, and a focal length of the second lens unit L2 is denoted by f2. In this case, it is preferred that at least one of the following conditional expressions be met.

$$1.3 < f3/R3n1 < 1.8 \quad (2)$$

$$1.1 < R3n1/R3n2 < 1.5 \quad (3)$$

$$1.86 < N3n \quad (4)$$

$$v3n < 29 \quad (5)$$

$$1.86 < N4n \quad (6)$$

$$-8.6 < D13w/f2 < -6.0 \quad (7)$$

Next, a technical meaning of each conditional expression will be described. Conditional Expression (2) is an expression of defining a ratio of the focal length of the third lens unit L3 and the radius of curvature of the lens surface at the object side of the negative lens in the third lens unit L3. Since the third lens unit L3 is configured only by a pair of cemented lenses, a radius of curvature where a spherical aberration coefficient and a coma aberration coefficient are reduced with respect to a desired focal length of the third lens unit L3 is limited. Accordingly, when a value exceeds the upper limit or the lower limit of Conditional Expression (2), it is difficult to correct the spherical aberration and the coma aberration at the wide angle end.

Conditional Expression (3) defines a ratio of the radii of curvature of the lens surfaces at the object side and the image side of the negative lens in the third lens unit L3. When a value exceeds the upper limit of Conditional Expression (3), which means the refractive power of the cemented lens surface in the third lens unit L3 is strengthened, it is difficult to correct the difference between the spherical aberrations in a short wavelength and a long wavelength. On the contrary, when the value exceeds the lower limit, the achromatic ability in the third lens unit L3 is insufficient, and as a result, an achromatizing operation needs to be performed by whole of the third lens unit L3 and the fourth lens unit L4.

As a result, when the third lens unit L3 and the fourth lens unit L4 are decentered due to a manufacturing error or the like, an imaging position is different for each wavelength and an image is obtained as if a large amount of chromatic aberration of magnification is generated, which is not preferable.

Conditional Expression (4) is an expression of defining the refractive index of the material of the negative lens in the third lens unit L3 for the d-line. When a value exceeds the lower limit of Conditional Expression (4), it is difficult to correct the spherical aberration and the coma aberration at the wide angle end. Conditional Expression (5) is an expression of defining the Abbe number of the material of the negative lens in the third lens unit L3. When a value exceeds the upper limit of Conditional Expression (5), it is difficult to correct the difference between the spherical aberrations in the short wavelength and the long wavelength at the wide angle end. Conditional Expression (6) is an expression of defining the refractive index of the material of the negative lens in the fourth lens unit L4 for the d-line. When a value exceeds the lower limit of Conditional Expression (6), it is difficult to correct the coma aberration at a zoom position of the intermediate focal length.

Conditional Expression (7) is an expression of defining the distance from the lens surface closest to the image side of the first lens unit L1 to the lens surface closest to the object side of the third lens unit L3 and the focal length of the second lens unit L2 at the wide angle end.

In each embodiment, the first lens unit L1 is fixed (is not moved) with respect to the image plane during zooming. An interval between the first lens unit L1 and the third lens unit L3 is changed by moving the second lens unit L2 to the image side so as to perform the magnification varying operation during zooming from the wide angle end to the telephoto end. Accordingly, in order to obtain the high zoom ratio, the moving amount of the second lens unit L2 is increased, the interval between the second lens unit L2 and the third lens unit L3 is increased at the wide angle end, and the diameter of the axial light beam entering the third lens unit L3 is enlarged.

In each embodiment, it is easy to correct the spherical aberration and the coma aberration at the wide angle end using the third lens unit L3. Therefore, the diameter of the axial light beam entering the third lens unit L3 is increased and it is easy to obtain the high zoom ratio.

When a value exceeds the upper limit of Conditional Expression (7), it is difficult to correct the variation of the field curvature during zooming. On the contrary, when the value exceeds the lower limit, it is difficult to achieve the high zoom ratio. It is more preferred that numerical ranges of Conditional Expressions (2) to (7) be set as follows.

$$1.4 < f3/R3n1 < 1.7 \quad (2a)$$

$$1.2 < R3n1/R3n2 < 1.4 \quad (3a)$$

$$1.9 < N3n \quad (4a)$$

$$v3n < 28.5 \quad (5a)$$

$$1.9 < N4n \quad (6a)$$

$$-8.2 < D13w/f2 < -6.3 \quad (7a)$$

As described above, according to each embodiment, a zoom lens that has an appropriate optical performance and a high zoom ratio and that reduces a manufacturing error with small number of lenses can be obtained.

In each embodiment, it is preferred that the third lens unit L3 be moved in a direction having a component of a direction perpendicular to the optical axis so as to perform an anti-shake operation (an image stabilization). In each embodiment, since it is easy to obtain an appropriate optical performance even when the third lens unit L3 and the fourth lens unit L4 are decentered, it is suitable for the function of moving the third lens unit L3 in the direction having the component of the direction perpendicular to the optical axis so as to correct the movement of the image caused by a hand shake. In each embodiment, it is preferred that the first lens unit L1 be, in order from the object side to the image side, configured by a cemented lens that is formed by cementing a negative lens and a positive lens, and a positive lens.

According to this, it is easy to correct the chromatic aberration of the total system. It is preferred that the second lens unit L2 be, in order from the object side to the image side, configured by a negative lens, a negative lens, and a positive lens that are provided independently of each other. According to this configuration, it is easy to reduce the variation of the aberration during zooming.

Next, referring to FIG. 9, the embodiment of the video camera which uses the zoom lens of the present invention as an image pickup optical system will be described. In FIG. 9, reference numeral 10 denotes a video camera body, and reference numeral 11 denotes an image pickup optical system that is configured by the zoom lens of the present invention. Reference numeral 12 denotes a solid-state image pickup element (a photoelectric conversion element) such as a CCD sensor or a CMOS sensor that receives light of an object image formed by the image pickup optical system 11. Reference numeral 13 denotes a memory that stores information corresponding to the object image photoelectrically converted by the image pickup element 12, and reference numeral 14 denotes a finder that is used to observe the object image displayed on a display element (not shown).

Thus, a small-size image pickup apparatus having a high optical performance can be achieved by applying the zoom lens of the present invention to the image pickup apparatus such as a video camera. The zoom lens of the present invention can also be applied to the digital still camera similarly. It can also be applied to a mirrorless single-lens-reflex camera that does not have a quick return mirror.

Hereinafter, Numerical examples 1 to 4 that correspond to Embodiments 1 to 4, respectively, are indicated. In each numerical examples, symbol i denotes an order of a surface counted from the object side, symbol ri denotes a radius of curvature of the i-th surface, symbol di denotes an interval between the i-th surface and the (i+1)-th surface, and symbols ndi and vdi denote a refractive index and Abbe number of the material of the i-th optical member with respect to the d-line, respectively. In Numerical examples 1 to 4, two surfaces closest to the image side are flat planes that correspond to optical blocks. An aspherical surface shape is denoted by X that is a displacement in an optical axis direction at a position of a height H from the optical axis with reference to an apex of a surface. A travel direction of light is positive, symbol R denotes a paraxial radius of curvature, symbol k denotes a conic constant, and symbol A denotes an aspherical coefficient. In this case, the aspherical surface shape is represented by the following expression.

$$x = \frac{H^2/R}{1+\sqrt{1-(1+k)(H/R)^2}} + AH^4 \quad (8)$$

Symbol "*" means a surface having the aspherical surface shape. The description of "e-x" means "$10^{-x}$". Table indicates a relationship between each conditional expression described above and numerical values in each numerical example.

NUMERICAL EXAMPLE 1

Unit mm
Surface data

| Surface number | r | d | nd | vd |
|---|---|---|---|---|
| 1 | 44.940 | 1.05 | 1.84666 | 23.9 |
| 2 | 23.862 | 4.30 | 1.60311 | 60.6 |
| 3 | −473.951 | 0.17 | | |
| 4 | 22.080 | 2.40 | 1.71300 | 53.9 |
| 5 | 51.210 | (variable) | | |
| 6 | 24.701 | 0.60 | 1.80400 | 46.6 |
| 7 | 4.650 | 3.20 | | |
| 8 | −21.240 | 0.60 | 1.80400 | 46.6 |
| 9 | 11.919 | 0.55 | | |
| 10 | 9.756 | 1.45 | 1.95906 | 17.5 |
| 11 | 27.784 | (variable) | | |
| 12 (stop) | ∞ | 0.90 | | |
| 13 | 12.152 | 0.60 | 1.95906 | 17.5 |
| 14 | 9.697 | 2.35 | 1.58313 | 59.4 |
| 15* | −39.554 | (variable) | | |
| 16 | 9.358 | 0.60 | 1.90366 | 31.3 |
| 17 | 5.830 | 2.52 | 1.48749 | 70.2 |
| 18 | −17.932 | (variable) | | |
| 19 | ∞ | 1.63 | 1.51633 | 64.1 |
| 20 | ∞ | 1.00 | | |
| Image plane | ∞ | | | |

Aspherical surface data
Fifteenth surface
K = −7.42118e+000 A 4 = 1.23507e−004

Various kinds of data
Zoom ratio 31.73

| | Wide angle | Intermediate | Telephoto |
|---|---|---|---|
| Focal length | 2.89 | 25.27 | 91.57 |
| F-number | 1.85 | 3.97 | 4.50 |
| Angle of field | 31.37 | 3.64 | 1.01 |
| Image height | 1.76 | 1.61 | 1.61 |

-continued

| | | |
|---|---|---|
| Total lens length | 65.95 | 65.95 | 65.95 |
| BF | 9.35 | 14.31 | 4.61 |
| d 5 | 0.50 | 20.28 | 25.22 |
| d11 | 26.95 | 7.17 | 2.23 |
| d15 | 7.85 | 2.90 | 12.59 |
| d18 | 7.28 | 12.23 | 2.54 |

Zoom lens unit data

| Unit | Start Surface | Focal length |
|---|---|---|
| 1 | 1 | 35.11 |
| 2 | 6 | −5.23 |
| 3 | 12 | 18.32 |
| 4 | 16 | 19.07 |
| 5 | 19 | ∞ |

NUMERICAL EXAMPLE 2

Unit mm
Surface data

| Surface number | r | d | nd | νd |
|---|---|---|---|---|
| 1 | 44.286 | 1.04 | 1.84666 | 23.8 |
| 2 | 24.271 | 4.28 | 1.59282 | 68.6 |
| 3 | −520.751 | 0.17 | | |
| 4 | 22.200 | 2.35 | 1.72000 | 50.2 |
| 5 | 52.927 | (variable) | | |
| 6 | 69.186 | 0.60 | 1.88300 | 40.8 |
| 7 | 4.883 | 2.97 | | |
| 8 | −19.056 | 0.62 | 1.83481 | 42.7 |
| 9 | 13.765 | 0.17 | | |
| 10 | 10.172 | 1.65 | 1.95906 | 17.5 |
| 11 | 62.913 | (variable) | | |
| 12 (stop) | ∞ | 0.75 | | |
| 13 | 11.903 | 1.32 | 2.10205 | 16.8 |
| 14 | 9.765 | 2.27 | 1.55332 | 71.7 |
| 15* | −33.145 | (variable) | | |
| 16 | 9.123 | 0.60 | 1.91082 | 35.3 |
| 17 | 5.803 | 2.60 | 1.49700 | 81.5 |
| 18 | −18.830 | (variable) | | |
| 19 | ∞ | 1.63 | 1.51633 | 64.1 |
| 20 | ∞ | 1.00 | | |
| Image plane | ∞ | | | |

Aspherical surface data
Fifteenth surface
K = −1.41708e+000 A 4 = 1.59187e−004

Various kinds of data
Zoom ratio 32.88

| | Wide angle | Intermediate | Telephoto |
|---|---|---|---|
| Focal length | 2.78 | 27.90 | 91.52 |
| F-number | 1.85 | 4.02 | 4.50 |
| Angle of field | 33.61 | 3.23 | 0.99 |
| Image height | 1.85 | 1.58 | 1.58 |
| Total lens length | 66.03 | 66.03 | 66.03 |
| BF | 9.08 | 14.54 | 5.35 |
| d 5 | 0.82 | 21.03 | 25.46 |
| d11 | 26.70 | 6.49 | 2.05 |
| d15 | 8.02 | 2.56 | 11.75 |
| d18 | 7.01 | 12.47 | 3.28 |

Zoom lens unit data

| Unit | Start Surface | Focal length |
|---|---|---|
| 1 | 1 | 34.74 |
| 2 | 6 | −4.96 |

-continued

| | | |
|---|---|---|
| 3 | 12 | 18.38 |
| 4 | 16 | 18.21 |
| 5 | 19 | ∞ |

NUMERICAL EXAMPLE 3

Unit mm
Surface data

| Surface number | r | d | nd | νd |
|---|---|---|---|---|
| 1 | 57.361 | 1.45 | 2.00069 | 25.5 |
| 2 | 30.951 | 4.26 | 1.59282 | 68.6 |
| 3 | −539.073 | 0.17 | | |
| 4 | 27.792 | 2.71 | 1.77250 | 49.6 |
| 5 | 73.513 | (variable) | | |
| 6 | 43.125 | 0.60 | 1.83481 | 42.7 |
| 7 | 5.681 | 4.19 | | |
| 8 | −20.687 | 0.60 | 1.77250 | 49.6 |
| 9 | 14.545 | 0.49 | | |
| 10 | 12.254 | 1.97 | 1.92286 | 18.9 |
| 11 | 62.658 | (variable) | | |
| 12 (stop) | ∞ | (variable) | | |
| 13 | 12.171 | 0.60 | 2.00330 | 28.3 |
| 14 | 9.150 | 3.28 | 1.55332 | 71.7 |
| 15* | −29.328 | (variable) | | |
| 16 | 11.279 | 0.60 | 2.00330 | 28.3 |
| 17 | 7.441 | 2.33 | 1.48749 | 70.2 |
| 18 | −26.656 | (variable) | | |
| 19 | ∞ | 1.98 | 1.51633 | 64.1 |
| 20 | ∞ | 1.00 | | |
| Image plane | ∞ | | | |

Aspherical surface data
Fifteenth surface
K = −1.04391e−400 A 4 = 4.07179e−005

Various kinds of data
Zoom ratio 36.67

| | Wide angle | Intermediate | Telephoto |
|---|---|---|---|
| Focal length | 3.09 | 8.43 | 113.40 |
| F-number | 1.85 | 2.91 | 4.50 |
| Angle of field | 36.04 | 14.94 | 1.14 |
| Image height | 2.25 | 2.25 | 2.25 |
| Total lens length | 79.79 | 79.79 | 79.79 |
| BF | 9.39 | 13.41 | 4.77 |
| d 5 | 0.50 | 13.44 | 32.86 |
| d11 | 26.35 | 6.94 | 2.26 |
| d12 | 9.10 | 11.62 | 1.42 |
| d15 | 11.18 | 11.11 | 15.21 |
| d18 | 7.09 | 11.11 | 2.47 |

Zoom lens unit data

| Unit | Start Surface | Focal length |
|---|---|---|
| 1 | 1 | 43.71 |
| 2 | 6 | −6.03 |
| 3 | 12 | ∞ |
| 4 | 13 | 19.42 |
| 5 | 16 | 25.86 |
| 6 | 19 | ∞ |

NUMERICAL EXAMPLE 4

Unit mm
Surface data

| Surface number | r | d | nd | vd |
|---|---|---|---|---|
| 1 | 42.179 | 1.50 | 1.84666 | 23.8 |
| 2 | 25.274 | 4.57 | 1.59282 | 68.6 |
| 3 | −32112.229 | 0.17 | | |
| 4 | 25.339 | 2.35 | 1.71300 | 53.9 |
| 5 | 57.594 | (variable) | | |
| 6 | 52.203 | 0.60 | 1.88300 | 40.8 |
| 7 | 4.873 | 3.08 | | |
| 8 | −18.143 | 0.60 | 1.80400 | 46.6 |
| 9 | 13.993 | 0.50 | | |
| 10 | 10.792 | 1.55 | 1.95906 | 17.5 |
| 11 | 46.060 | (variable) | | |
| 12 (stop) | ∞ | 0.68 | | |
| 13 | 12.900 | 0.83 | 2.00330 | 28.3 |
| 14 | 10.182 | 2.69 | 1.49710 | 81.6 |
| 15* | −27.582 | (variable) | | |
| 16 | 9.961 | 0.60 | 2.00330 | 28.3 |
| 17 | 6.685 | 2.67 | 1.48749 | 70.2 |
| 18 | −18.101 | (variable) | | |
| 19 | ∞ | 1.63 | 1.51633 | 64.1 |
| 20 | ∞ | 1.00 | | |
| Image plane | ∞ | | | |

Aspherical surface data
Fifteenth surface
K = −3.16607e+000 A 4 = 9.93502e−005

Various kinds of data
Zoom ratio 49.97

| | Wide angle | Intermediate | Telephoto |
|---|---|---|---|
| Focal length | 2.71 | 35.46 | 135.42 |
| F-number | 1.85 | 5.67 | 6.40 |
| Angle of field | 34.32 | 2.54 | 0.67 |
| Image height | 1.85 | 1.58 | 1.58 |
| Total lens length | 74.38 | 74.38 | 74.38 |
| BF | 10.80 | 18.07 | 4.20 |
| d 5 | 0.72 | 24.52 | 29.05 |
| d11 | 30.44 | 6.63 | 2.10 |
| d15 | 10.03 | 2.76 | 16.63 |
| d18 | 8.73 | 16.00 | 2.13 |

Zoom lens unit data

| Unit | Start Surface | Focal length |
|---|---|---|
| 1 | 1 | 38.68 |
| 2 | 6 | −4.88 |
| 3 | 12 | 21.67 |
| 4 | 16 | 19.70 |
| 5 | 19 | ∞ |

TABLE 1

| CONDITIONAL EXPRESSION | NUMERICAL EXAMPLES | | | |
|---|---|---|---|---|
| | 1 | 2 | 3 | 4 |
| (1) | 0.961 | 1.009 | 0.751 | 1.100 |
| (2) | 1.51 | 1.54 | 1.60 | 1.68 |
| (3) | 1.25 | 1.22 | 1.33 | 1.27 |
| (4) | 1.959 | 2.102 | 2.003 | 2.003 |
| (5) | 17.47 | 16.77 | 28.27 | 28.27 |
| (6) | 1.904 | 1.911 | 2.003 | 2.003 |
| (7) | −6.65 | −6.92 | −7.26 | −7.82 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-268811, filed on Dec. 8, 2011, which is hereby incorporated by reference herein in its entirety.

What is claimed is:

1. A zoom lens comprising:
in order from an object side to an image side,
(a) a first lens unit having a positive refractive power;
(b) a second lens unit having a negative refractive power;
(c) a third lens unit having a positive refractive power; and
(d) a fourth lens unit having a positive refractive power,
wherein, during zooming, the first lens unit is fixed and at least the second lens unit and the fourth lens unit are moved,
wherein the third lens unit includes a cemented lens that is formed by cementing a negative lens having a meniscus shape convex towards the object side and a positive lens,
wherein the fourth lens unit includes a cemented lens that is formed by cementing a negative lens having a meniscus shape convex towards the object side and a positive lens, and
wherein the following conditional expression is met:

$$0.68 < f3/f4 < 1.20$$

where f3 and f4 are focal lengths of the third lens unit and the fourth lens unit respectively.

2. The zoom lens according to claim 1, wherein the following conditional expressions are met:

$$1.3 < f3/R3n1 < 1.8$$

$$1.1 < R3n1/R3n2 < 1.5$$

where R3$n$ and R3$n$2 are radii of curvature of lens surfaces at the object side and the image side of the negative lens of the third lens unit.

3. The zoom lens according to claim 1, wherein the following conditional expressions are met:

$$1.86 < N3n$$

$$\nu 3n < 29$$

$$1.86 < N4n$$

where N3$n$ and ν3$n$ are a refractive index and Abbe number of a material of the negative lens of the third lens unit respectively, and N4$n$ is a refractive index of a material of the negative lens of the fourth lens unit.

4. The zoom lens according to claim 1, wherein the following conditional expression is met:

$$-8.6 < D13w/f2 < -6.0$$

where D13$w$ is a distance from a lens surface closest to the image side of the first lens unit to a lens surface closest to the object side of the third lens unit at a wide angle end, and f2 is a focal length of the second lens unit.

5. The zoom lens according to claim 1, wherein the third lens unit is moved to a direction having a component of a direction perpendicular to an optical axis so as to move a shot image in the direction perpendicular to the optical axis.

6. The zoom lens according to claim 1, wherein the second lens unit is moved to the image side, and the fourth lens unit is moved along a locus convex towards the object side during zooming from a wide angle end to a telephoto end.

7. The zoom lens according to claim 1, further comprising an aperture stop between the second lens unit and the third lens unit, wherein the second lens unit is moved to the image side, and the aperture stop, the third lens unit, and the fourth lens unit are moved along a locus convex towards the object side during zooming from a wide angle end to a telephoto end.

8. The zoom lens according to claim 1, wherein the second lens unit includes, in order from the object side to the image side, a negative lens, a negative lens, and a positive lens.

9. An image pickup apparatus comprising:
a zoom lens; and
an image pickup element configured to receive light of an image formed by the zoom lens,
wherein the zoom lens comprises:
in order from an object side to an image side,
(a) a first lens unit having a positive refractive power;
(b) a second lens unit having a negative refractive power;
(c) a third lens unit having a positive refractive power; and
(d) a fourth lens unit having a positive refractive power,
wherein, during zooming, the first lens unit is fixed and at least the second lens unit and the fourth lens unit are moved,
wherein the third lens unit includes a cemented lens that is formed by cementing a negative lens having a meniscus shape convex towards the object side and a positive lens,
wherein the fourth lens unit includes a cemented lens that is formed by cementing a negative lens having a meniscus shape convex towards the object side and a positive lens, and
wherein the following conditional expression is met:

$$0.68 < f3/f4 < 1.20$$

where f3 and f4 are focal lengths of the third lens unit and the fourth lens unit respectively.

10. The zoom lens according to claim 1, wherein during zooming from a wide angle end to a telephoto end, the second lens unit moves toward the image side, and the fourth lens unit moves toward the object side and thereafter toward the image side, and
wherein during focusing, the fourth lens unit moves.

11. The zoom lens according to claim 1, further comprising an aperture stop,
wherein during zooming from a wide angle end to a telephoto end, the second lens unit moves toward the image side, and the aperture stop, the third lens unit, and the fourth lens unit move toward the object side and thereafter toward the image side.

* * * * *